United States Patent
Boxwell et al.

(10) Patent No.: US 10,803,242 B2
(45) Date of Patent: Oct. 13, 2020

(54) CORRECTION OF MISSPELLINGS IN QA SYSTEM

(71) Applicant: International Business Machines Corporation, Armonk, NY (US)

(72) Inventors: Stephen A. Boxwell, Columbus, OH (US); Keith G. Frost, Delaware, OH (US); Stanley J. Vernier, Grove City, OH (US); Kyle M. Brake, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 16/171,782

(22) Filed: Oct. 26, 2018

(65) Prior Publication Data
US 2020/0134010 A1   Apr. 30, 2020

(51) Int. Cl.
*G06F 40/232*   (2020.01)
*G10L 15/26*   (2006.01)
*G06K 9/34*   (2006.01)
*G06F 16/332*   (2019.01)
*G06F 40/284*   (2020.01)
*G06F 40/20*   (2020.01)

(52) U.S. Cl.
CPC ........ *G06F 40/232* (2020.01); *G06F 16/3329* (2019.01); *G06F 40/20* (2020.01); *G06F 40/284* (2020.01); *G06K 9/344* (2013.01); *G10L 15/26* (2013.01); *G06K 2209/01* (2013.01)

(58) Field of Classification Search
CPC ............... G06F 17/273; G06F 16/3329; G06F 16/90332
See application file for complete search history.

(56) References Cited

U.S. PATENT DOCUMENTS 4,251,799 A    2/1981  Jih
6,154,579 A *  11/2000 Goldberg ................. G06K 9/03
                                                              382/228
6,205,261 B1 * 3/2001  Goldberg ................. G06K 9/03
                                                              382/187

(Continued)

OTHER PUBLICATIONS

Halil Kilicoglu et al., "An Ensemble Method for Spelling Correction in Consumer Health Questions", AMIA Annu Symp Proc. 2015; 2015: 727-736; Published online Nov. 5, 2015; PMCID: PMC4765565; PMID: 26958208; 10 pages (Year: 2015).*

(Continued)

*Primary Examiner* — Scott T Baderman
*Assistant Examiner* — Benjamin Smith
(74) *Attorney, Agent, or Firm* — Pepper Hamilton LLP (57) ABSTRACT

Embodiments provide a computer implemented method for identifying and correcting a misspelling in a question answering (QA) system, wherein the QA system is coupled to a document corpus, and the document corpus includes a plurality of documents related to a particular domain. The method includes the following steps: receiving an input question and a plurality of passages, wherein the plurality of passages are extracted from the document corpus by the QA system; providing at least one alternate form for each token extracted from the input question and the plurality of passages; identifying at least one misspelled token; and scoring at least one alternate form of each identified misspelled token.

6 Claims, 4 Drawing Sheets

(56) References Cited

U.S. PATENT DOCUMENTS

| | | | | |
|---|---|---|---|---|
| 6,442,524 B1* | 8/2002 | Ecker | G10L 15/18 | 704/277 |
| 6,873,993 B2* | 3/2005 | Charlesworth | G06F 16/3343 | 707/740 |
| 7,089,188 B2* | 8/2006 | Logan | G06F 16/685 | 704/270 |
| 7,110,621 B1* | 9/2006 | Greene | G06K 9/03 | 382/310 |
| 7,254,774 B2* | 8/2007 | Cucerzan | G06F 16/9532 | 715/257 |
| 7,406,201 B2* | 7/2008 | Heilper | G06K 9/344 | 382/159 |
| 7,488,886 B2* | 2/2009 | Kemp | G10H 1/0008 | 84/609 |
| 7,689,588 B2* | 3/2010 | Badr | G06F 16/90344 | 707/999.103 |
| 7,810,030 B2* | 10/2010 | Wu | G06F 40/232 | 715/257 |
| 8,131,756 B2* | 3/2012 | Carus | G06N 20/00 | 707/776 |
| 8,201,087 B2* | 6/2012 | Kay | G06F 40/232 | 715/257 |
| 8,225,203 B2* | 7/2012 | Unruh | G06F 3/0233 | 715/255 |
| 8,275,803 B2* | 9/2012 | Brown | G06F 16/334 | 707/802 |
| 8,321,442 B2* | 11/2012 | Huang | G06F 16/90344 | 707/760 |
| 8,321,471 B2* | 11/2012 | Cucerzan | G06F 40/232 | 707/803 |
| 8,412,848 B2* | 4/2013 | Therrien | H03M 7/3084 | 709/247 |
| 8,429,526 B2* | 4/2013 | Sthanikam | G06F 40/194 | 715/255 |
| 8,560,300 B2 | 10/2013 | Ferrucci et al. | | |
| 8,768,925 B2* | 7/2014 | Brown | G06F 16/3344 | 707/736 |
| 8,812,738 B2* | 8/2014 | Therrien | H03M 7/3084 | 709/247 |
| 8,892,996 B2* | 11/2014 | Unruh | G06F 3/04883 | 715/255 |
| 9,053,350 B1 | 6/2015 | Abdulkader et al. | | |
| 9,069,753 B2* | 6/2015 | Wu | G06F 40/232 | |
| 9,092,419 B2* | 7/2015 | Kay | G06F 3/0237 | |
| 9,183,297 B1 | 11/2015 | Baker | | |
| 9,223,794 B2* | 12/2015 | Therrien | H03M 7/3084 | |
| 9,224,386 B1* | 12/2015 | Weber | G10L 15/06 | |
| 9,251,413 B2* | 2/2016 | Meier | G06K 9/00463 | |
| 9,613,025 B2 | 4/2017 | Heo | | |
| 9,633,271 B2 | 4/2017 | Stella | | |
| 9,654,492 B2* | 5/2017 | Maylor | H04L 63/1433 | |
| 9,740,767 B2* | 8/2017 | Quinion | G06F 16/951 | |
| 9,747,734 B2* | 8/2017 | Chaar | G06F 3/016 | |
| 9,785,830 B2* | 10/2017 | Hausmann | G06K 9/00463 | |
| 9,836,646 B2* | 12/2017 | Collet | G06K 9/00422 | |
| 9,934,526 B1* | 4/2018 | Dhua | G06Q 30/0623 | |
| 9,953,644 B2 | 4/2018 | Selfridge et al. | | |
| 9,984,219 B2* | 5/2018 | Chaar | G06F 21/316 | |
| 10,019,983 B2* | 7/2018 | Ganapathiraju | G10L 15/01 | |
| 10,031,836 B2* | 7/2018 | Versteeg | G06F 11/3664 | |
| 10,402,490 B1* | 9/2019 | Benavides | G06F 40/279 | |
| 2003/0187649 A1* | 10/2003 | Logan | G06F 16/685 | 704/260 |
| 2004/0260543 A1* | 12/2004 | Horowitz | G10L 15/22 | 704/221 |
| 2005/0123203 A1* | 6/2005 | Heilper | G06K 9/723 | 382/229 |
| 2005/0210017 A1* | 9/2005 | Cucerzan | G06F 16/9532 | |
| 2005/0240253 A1* | 10/2005 | Tyler | A61B 5/1124 | 607/134 |
| 2006/0048055 A1* | 3/2006 | Wu | G06F 40/232 | 715/262 |
| 2006/0064177 A1* | 3/2006 | Tian | G10L 15/197 | 700/1 |
| 2006/0161218 A1* | 7/2006 | Danilov | A61N 1/36014 | 607/45 |
| 2006/0241718 A1* | 10/2006 | Tyler | A61B 5/486 | 607/45 |
| 2007/0106937 A1* | 5/2007 | Cucerzan | G06F 16/9535 | 715/257 |
| 2007/0131094 A1* | 6/2007 | Kemp | G06F 16/632 | 84/609 |
| 2007/0179784 A1* | 8/2007 | Thambiratnam | G10L 15/26 | 704/255 |
| 2008/0009772 A1* | 1/2008 | Tyler | G06F 3/015 | 600/595 |
| 2008/0019496 A1* | 1/2008 | Taschereau | H04L 29/06 | 379/218.01 |
| 2008/0025596 A1* | 1/2008 | Podilchuk | G06K 9/6215 | 382/155 |
| 2008/0028303 A1* | 1/2008 | Wu | G06F 40/232 | 715/262 |
| 2008/0073851 A1* | 3/2008 | Myers | A63F 9/18 | 273/430 |
| 2008/0189605 A1* | 8/2008 | Kay | G06F 40/274 | 715/257 |
| 2008/0208854 A1* | 8/2008 | Badr | G06F 16/90344 | |
| 2008/0215541 A1* | 9/2008 | Li | G06F 16/951 | |
| 2008/0228239 A1* | 9/2008 | Tyler | A61B 5/682 | 607/45 |
| 2009/0287678 A1* | 11/2009 | Brown | G06F 17/28 | |
| 2009/0306741 A1* | 12/2009 | Hogle | A61N 1/36103 | 607/54 |
| 2009/0312817 A1* | 12/2009 | Hogle | A61B 5/682 | 607/54 |
| 2009/0317003 A1* | 12/2009 | Heilper | G06K 9/723 | 382/229 |
| 2010/0235854 A1* | 9/2010 | Badgett | G09B 7/00 | 725/24 |
| 2010/0293451 A1* | 11/2010 | Carus | G06N 20/00 | 715/230 |
| 2010/0306412 A1* | 12/2010 | Therrien | G06F 11/1453 | 709/247 |
| 2011/0022952 A1* | 1/2011 | Wu | G06F 40/232 | 715/257 |
| 2011/0090253 A1* | 4/2011 | Good | G06K 9/00671 | 345/633 |
| 2011/0125734 A1 | 5/2011 | Duboue et al. | | |
| 2011/0193797 A1* | 8/2011 | Unruh | G06F 3/0418 | 345/173 |
| 2011/0320481 A1* | 12/2011 | Huang | G06F 16/3337 | 707/769 |
| 2012/0197939 A1 | 8/2012 | Shahar | | |
| 2012/0254744 A1* | 10/2012 | Kay | G06F 3/0237 | 715/257 |
| 2012/0268381 A1* | 10/2012 | Unruh | G06F 3/0418 | 345/168 |
| 2013/0007033 A1* | 1/2013 | Brown | G06N 5/02 | 707/764 |
| 2013/0290474 A1* | 10/2013 | Therrien | H04L 29/08549 | 709/216 |
| 2014/0067391 A1* | 3/2014 | Ganapathiraju | G10L 15/01 | 704/236 |
| 2014/0280285 A1* | 9/2014 | Quinion | G06F 16/3325 | 707/766 |
| 2014/0337299 A1* | 11/2014 | Therrien | H04L 29/08549 | 707/692 |
| 2014/0369602 A1* | 12/2014 | Meier | G06K 9/6218 | 382/182 |
| 2015/0290453 A1* | 10/2015 | Tyler | G06F 3/015 | 607/134 |
| 2015/0356106 A1* | 12/2015 | Hendrey | G06F 16/319 | 707/706 |
| 2015/0363215 A1* | 12/2015 | Versteeg | G06F 11/3684 | 703/23 |
| 2016/0004766 A1 | 1/2016 | Danielyan et al. | | |
| 2016/0117551 A1* | 4/2016 | Hausmann | G06K 9/00469 | 382/161 |

(56) References Cited

U.S. PATENT DOCUMENTS

| | | | |
|---|---|---|---|
| 2016/0170989 A1 | 6/2016 | Bishop et al. | |
| 2016/0171804 A1* | 6/2016 | Chaar | G06F 3/0418 340/5.52 |
| 2016/0335244 A1* | 11/2016 | Weisman | G06F 40/232 |
| 2017/0078321 A1* | 3/2017 | Maylor | H04L 51/046 |
| 2017/0109573 A1* | 4/2017 | Collet | G06K 9/348 |
| 2017/0242989 A1* | 8/2017 | Chaar | G07C 9/25 |
| 2017/0278038 A1* | 9/2017 | Wu | G06Q 10/06 |
| 2018/0107648 A1 | 4/2018 | Ackermann et al. | |
| 2018/0308003 A1* | 10/2018 | Singh | G06F 16/3331 |
| 2018/0349965 A1* | 12/2018 | More | G06Q 30/0277 |
| 2019/0019058 A1* | 1/2019 | Woodbridge | G06T 7/168 |
| 2019/0147353 A1* | 5/2019 | Beller | G06F 16/433 706/12 |
| 2020/0175987 A1* | 6/2020 | Thomson | G10L 15/30 |

OTHER PUBLICATIONS

Eric Brill and Robert C. Moore; "An Improved Error Model for Noisy Channel Spelling Correction"; Microsoft Research; Proceedings of the 38th Annual Meeting on Association for Computational Linguistics; 8 pages (Year: 2000).*

Aouragh Si Lhoussain et al., "Adaptating the Levenshtein Distance to Contextual Spelling Correction"; International Journal of Computer Science and Applications, vol. 12, No. 1, pp. 127-133, 2015, 8 pages (Year: 2015).*

Gueddah Hicham et al., "Introduction of the weight edition errors in the Levenshtein distance", International Journal of Advanced Research in Artificial Intelligence (IJARAI), arXiv:1208.4503, 2012, 3 pages (Year: 2012).*

Abdulkader, Ahmad, et al. "Low Cost Correction of OCR Errors Using Learning in a Multi-Engine Environment." 2009 10th International Conference on Document Analysis and Recognition. 2009. pp. 576-580.

* cited by examiner

CORRECTION OF MISSPELLINGS IN QA SYSTEM

TECHNICAL FIELD

The present disclosure relates generally to a system, method and computer program product which are used to identify and correct misspellings generated by Optical Character Recognition (OCR) or Speech-to-Text (STT) in a Question Answering (QA) system.

BACKGROUND

Question answering (QA) is a computer science discipline within the fields of information retrieval and natural language processing (NLP), which is concerned with building systems that automatically answer questions posed by humans in a natural language. A QA implementation, usually a computer program, may construct its answers by querying a structured database of knowledge or information, usually a knowledge base. QA systems can also pull answers from an unstructured collection of natural language documents.

In a QA system that relies on source documents obtained through an OCR system, and/or receives questions obtained through a STT system, some misspellings or close word variants are to be expected in machine-encoded documents and machine-encoded questions. The unavoidable errors can have a fatal impact in a question answering task. For example, a user asks the question "[w]hat kind of fighter did Luke Skywalker pilot?" There is a passage in the machine-encoded documents obtained through OCR saying "Luke Skywalker was the pitot of an X-Wing fighter in the Battle of Yavin." In this instance, the OCR system erroneously identified a word in the passage as "pitot," while this word in the source document probably reads "pilot." This error causes a critical mismatch between the question and the passage, which could cause a failure to recognize "X-Wing" as the correct answer.

For another example, a question "[w]hat is the proper name for a loss of containment in the Warp Core?" is submitted to the QA system. The QA system includes a machine-encoded document obtained by scanning a hard-copy document (e.g., a technical manual) using an OCR system. There is a passage in the machine-encoded document saying "[w]hen the Warp Care experiences a loss of containment, the resulting explosion is referred to as a 'breach'." This passage is highly relevant, but the OCR system made a critical error when converting the scanned technical manual to the machine-encoded document (i.e., a searchable document) and the passage refers to "Warp Care" instead of "Warp Core." The phrase "Warp Core" is a single lexical item and one of the most critical elements of this question, and failure to recognize this phrase could cause a failure to recognize "breach" as the correct answer.

Thus, there is a need to identify misspelling errors in the machine-encoded questions obtained through STT or machine-encoded documents obtained through OCR, so that the correct answer can be retrieved by the QA system.

SUMMARY

Embodiments provide a computer implemented method for identifying and correcting a misspelling in a question answering (QA) system, wherein the QA system is coupled to a document corpus, and the document corpus includes a plurality of documents related to a particular domain, the method comprising: receiving, by a processor coupled to one or more user devices, an input question and a plurality of passages, wherein the plurality of passages are extracted from the document corpus by the QA system; providing, by the processor, at least one alternate form for each token extracted from the input question and the plurality of passages; identifying, by the processor, at least one misspelled token from the input question and the plurality of passages; and scoring, by the processor, at least one alternate form of each identified misspelled token.

In an embodiment, the method further comprising: providing, by the processor, a modified Levenshtein distance value for each alternate form, wherein the modified Levenshtein distance value is between 0 and 1; and identifying, by the processor, at least one token having the modified Levenshtein distance value more than a predetermined threshold value.

In an embodiment, wherein the input question is submitted to the QA system through a speech to text process, and the modified Levenshtein distance value of each token of the input question is provided based on a first substitution confusion matrix associated with misspellings generated during the speech to text process.

In an embodiment, wherein in the first substitution confusion matrix, a first group of characters are substituted with a single character, or a second group of characters.

In an embodiment, wherein the plurality of passages of the document corpus are provided through an optical character recognition process, and the modified Levenshtein distance value of each token of the plurality of passages is provided based on a second substitution confusion matrix associated with misspellings generated during the optical character recognition process.

In an embodiment, wherein in the second substitution confusion matrix, a first group of characters are substituted with a single character, or a second group of characters.

In an embodiment, wherein the plurality of passages of the document corpus is provided through an optical character recognition process, and the modified Levenshtein distance value of each token of the plurality of passages is provided based on a second substitution confusion matrix associated with misspellings generated during the optical character recognition process.

In an embodiment, wherein the at least one alternate form includes a synonym and a corrected spelling of the at least one misspelled token.

Embodiments further provide a computer program product for identifying and correcting a misspelling in a question answering (QA) system, the computer program product comprising a computer readable storage medium having program instructions embodied therewith, the program instructions executable by a processor to cause the processor to: receive, by a processor coupled to one or more user devices, an input question and a plurality of passages, wherein the plurality of passages are extracted from the document corpus by the QA system; provide, by the processor, at least one alternate form for each token extracted from the input question and the plurality of passages; provide, by the processor, a modified Levenshtein distance value for each alternate form, wherein the modified Levenshtein distance value is between 0 and 1; identify, by the processor, at least one misspelled token and at least one token having the modified Levenshtein distance value more than a predetermined threshold value from the input question and the plurality of passages; and score, by the processor, at least one alternate form of each identified misspelled token.

In an embodiment, wherein the input question is submitted to the QA system through a speech to text process, and the modified Levenshtein distance value of each token of the input question is provided based on a first substitution confusion matrix associated with misspellings generated during the speech to text process.

In an embodiment, wherein in the first substitution confusion matrix, a first group of characters are substituted with a single character, or a second group of characters.

In an embodiment, wherein the plurality of passages of the document corpus are provided through an optical character recognition process, and the modified Levenshtein distance value of each token of the plurality of passages is provided based on a second substitution confusion matrix associated with misspellings generated during the optical character recognition process.

In an embodiment, wherein in the second substitution confusion matrix, a first group of characters are substituted with a single character, or a second group of characters.

In an embodiment, wherein the plurality of passages of the document corpus are provided through an optical character recognition process, and the modified Levenshtein distance value is provided based on a second substitution confusion matrix associated with misspellings generated during the optical character recognition process.

In an embodiment, wherein the at least one alternate form includes a synonym and a corrected spelling of the at least one misspelled token.

Embodiments further provide a system for identifying and correcting a misspelling in a question answering (QA) system, comprising: a processor configured to: receive, by a processor coupled to one or more user devices, an input question and a plurality of passages, wherein the plurality of passages are extracted from the document corpus by the QA system; provide, by the processor, at least one alternate form for each token extracted from the input question and the plurality of passages; provide, by the processor, a modified Levenshtein distance value for each alternate form, wherein the modified Levenshtein distance value is between 0 and 1; identify, by the processor, at least one misspelled token and at least one token having the modified Levenshtein distance value more than a predetermined threshold value from the input question and the plurality of passages; and score, by the processor, at least one alternate form of each identified misspelled token.

In an embodiment, wherein the input question is submitted to the QA system through a speech to text process, and the modified Levenshtein distance value of each token of the input question is provided based on a first substitution confusion matrix associated with misspellings generated during the speech to text process.

In an embodiment, wherein the plurality of passages of the document corpus are provided through an optical character recognition process, and the modified Levenshtein distance value of each token of the plurality of passages is provided based on a second substitution confusion matrix associated with misspellings generated during the optical character recognition process.

In an embodiment, wherein in the first substitution confusion matrix and the second substitution confusion matrix, a first group of characters are substituted with a single character, or a second group of characters.

In an embodiment, wherein the at least one alternate form includes a synonym and a corrected spelling of the at least one misspelled token.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Embodiments of the present invention may be a system, a method, and/or a computer program product. The computer program product may include a computer readable storage medium (or media) having computer readable program instructions thereon for causing a processor to carry out aspects of the present invention.

In an embodiment, a system, method, and computer program product for identifying and correcting misspelling errors are disclosed. With the system, method and computer program product, the misspelling errors generated through OCR and/or STT can be identified and the alternate forms for the misspelling errors can be provided for scoring, so that correct answers can be retrieved in response to questions raised by QA system users.

In an embodiment, a misspelling correction unit for a QA system is provided and integrated in the QA system (also called QA pipeline). In another embodiment, the misspelling correction unit can be provided separately from the QA system. The misspelling correction unit can identify token (i.e., a string which is made of at least one character) candidates to be corrected in a question and related passages of corpus. The misspelling correction unit then utilizes at least one confusion matrix to measure similarities between characters or groups of characters, and provide alternate forms of the identified token candidates. The misspelling correction unit can then score the token candidates and their alternate forms (e.g., synonyms, or corrections for misspellings), so that the final answer and/or its supporting passage can be obtained.

Figure 1:
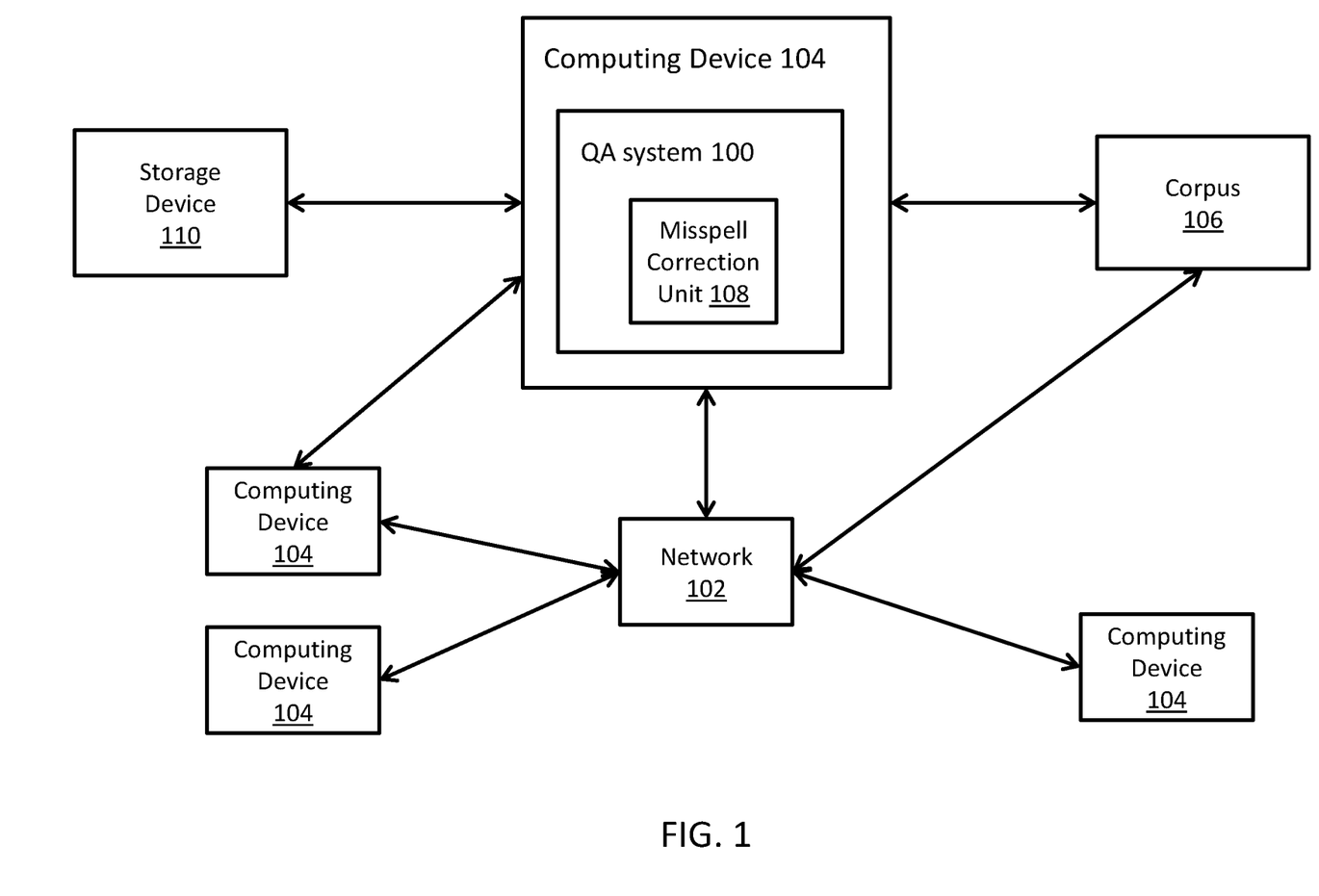
FIG. 1 depicts a schematic diagram of one illustrative embodiment of a question answering (QA) system implementing a misspelling correction unit.

FIG. 1 depicts a schematic diagram of one illustrative embodiment of a QA system 100 including a misspelling correction unit 108. The QA system is implemented on one or more computing devices 104 (comprising one or more processors and one or more memories, and potentially any other computing device elements generally known in the art including buses, storage devices, communication interfaces, and the like) connected to the computer network 102. A plurality of computing devices 104 communicate with each other through the computer network 102. The computer network 102 can be one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices.

The QA system 100 is configured to receive inputs from various sources. For example, the QA system 100 receives input from the computer network 102, a corpus of electronic documents 106, QA system users, and/or other data and other possible sources of input. In one embodiment, some or all of the inputs to the QA system 100 are routed through the computer network 102. The various computing devices 104 include access points for content creators and QA system users. Some of the computing devices 104 include devices for a database storing the corpus of data 106. The computer network 102 includes local network connections and remote connections in various embodiments, such that the QA system 100 may operate in environments of any size, including local and global, e.g., the Internet.

In one embodiment, the content creator creates content in a document of the corpus of data 106. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user containing one or more answers to the question. In one embodiment, the QA system 100 provides a response to users in a ranked list of candidate answers. In a further embodiment, the QA system 100 provides a single final answer, or a combination of a final answer and ranked listing of other candidate answers. In a further embodiment, the QA system 100 provides a single final answer, together with a supporting passage. In another embodiment, the QA system 100 provides a ranked list of candidate answers, together with a ranked list of supporting passages.

In some illustrative embodiments, the QA system 100 may be implemented on a cognitive system, for example IBM Watson™ cognitive system available from International Business Machines Corporation. The QA system of the IBM Watson™ cognitive system receives an input question, which it then parses to extract the major features of the question, and which in turn are then used to formulate queries that are applied to the corpus of data. Based on the application of the queries to the corpus of data, a set of hypotheses, or candidate answers to the input question, are generated by looking across the corpus 106 to retrieve passages in documents of the corpus 106, potentially including a valuable response to the input question. The QA system of the IBM Watson™ cognitive system then performs deep analysis on the language of the input question and the language used in each of the passages found during the application of the queries using a variety of reasoning algorithms. The scores obtained from the various reasoning algorithms are then weighted against a statistical model that summarizes a level of confidence that the QA system of the IBM Watson™ cognitive system has regarding the evidence that the potential response, i.e., candidate answer, is inferred by the question. This process is repeated for each of the candidate answers to generate a ranked listing of candidate answers which may then be presented to the user who submits the input question, or from which a final answer is selected and presented to the user.

In an embodiment, results from the corpus 106 are stored in storage device 110 associated with the QA system 100. The storage device 110 may be a memory, a hard disk based storage device, flash memory, solid state storage device, or the like.

Figure 2:
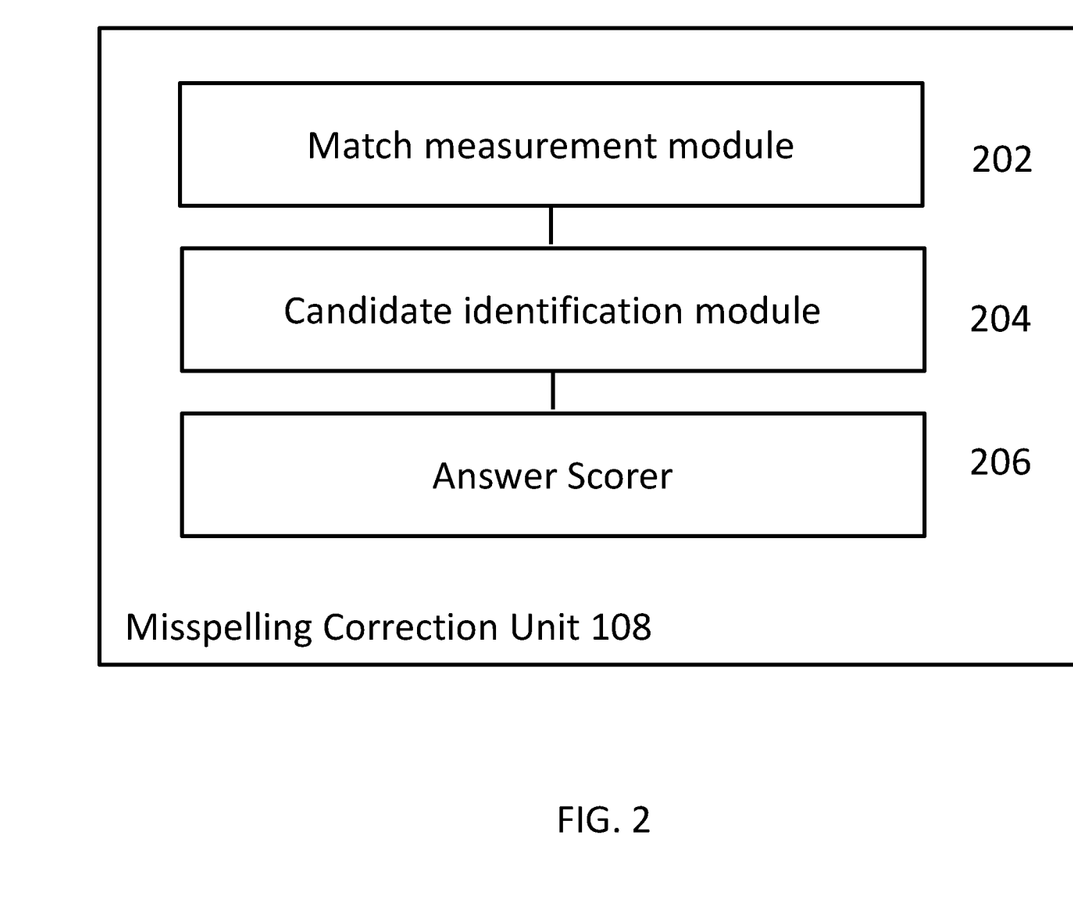
FIG. 2 is a block diagram of the misspelling correction unit, according to some embodiments described herein.

As shown in FIG. 1, in accordance with some illustrative embodiments, the QA system 100 is further augmented, in accordance with the mechanisms of the illustrative embodiments, to include logic implemented in specialized hardware, software executed on hardware, or any combination of specialized hardware and software executed on hardware, for implementing a misspelling correction unit 108. Referring to FIG. 2, the misspelling correction unit 108 includes match measurement module 202, candidate identification module 204, and answer scorer 206.

The match measurement module 202 uses a modified Levenshtein distance metric to evaluate matching degree for misspellings caused by an OCR or STT process. The passages related to the question raised by a QA system user are retrieved by the QA system 100, and one example of a question/answer generation operation which may be used in conjunction with the principles described herein is described in U.S. Patent Application Publication No. US20110125734A1, which is herein incorporated by reference in its entirety.

If the related passages in the corpus 106 are obtained through an OCR process, certain variations are common, especially if source documents have been damaged, weathered, or mimeographed. For example, the character "e" is often mistaken for "o", the character "a" is often mistaken for "o", the character "i" is often mistaken for "t," the string (group of characters) "rn" is often mistaken for "m," and vice versa. If questions are submitted to the QA system 100 through an STT process, certain characters or character combinations are easily mistaken for others. For example, the string "ed" is often mistaken for "te," the character "s" is often mistaken for "th," the character "t" is often mistaken for "k," the string "sh" is often mistaken for "s," the string "ai" is often mistaken for "e," and vice versa.

As to the related passages in the corpus 106 obtained through OCR, a substitution confusion matrix is provided, where e.g., "e"→"o"=0, "i"→"t"=0, "a"→"o"=0, "rn"→"m"=0, " "→" "=0. Further, less likely but reasonable substitutions could be provided with a value between 0 and 1, reflecting their less perfect matches (e.g., "s"→"5"=0.5). Additionally, the other character substitutions=1, indicating a complete mismatch. With this substitution confusion matrix, e.g., the modified Levenshtein distance between the "meet" and "moot" is 0, which indicates that "meet" is equivalent to "moot;" the modified Levenshtein distance between "screeds" and "5 reeds" is 0.5, reflecting an imperfect match.

Alternately, as to questions submitted through STT, a different substitution confusion matrix is provided, where e.g., sh→s=0, ai→e=0, ed→te=0, s→th=0, t→k=0. Further, less likely but reasonable substitutions could be provided with a value between 0 and 1, reflecting their less perfect matches. Additionally, the other character substitutions=1, indicating a complete mismatch. With this substitution confusion matrix, e.g., the modified Levenshtein distance between "shed" and "said" is 0, which indicates that "shed" is equivalent to "said."

As mentioned above, a modified Levenshtein distance algorithm is provided. The modified Levenshtein distance is provided between 0 to 1, with 0 indicating a perfect match, while 1 indicating a complete mismatch. The modified Levenshtein distance algorithm is proposed to identify misspellings generated during OCR or STT process, and provide alternate forms for the misspellings. Additionally, a group of characters (e.g., "sh", "ai", "ed"), instead of only a single character, can be taken into account in the substitutions. Alternate forms for the original tokens of the question and the related passages can be generated in the substitutions.

The candidate identification module 204 is configured to identify tokens which may be misspellings. The misspellings can be out of vocabulary words, real words (e.g., "pilot" misspelled as "pitot"). In an embodiment, the candidate identification module 204 looks for out-of-vocabulary tokens, tokens that are uncommon in a specific domain (e.g., the tokens are real words, but misspelled), or tokens whose alternate forms have high modified Levenshtein distance values (i.e., 1 or close to 1). The candidate identification module 204 looks for out-of-vocabulary tokens, uncommon tokens, or tokens whose alternate forms have high modified Levenshtein distance values, in the question raised by the QA system user and/or passages potentially containing a candidate answer. The tokens whose alternate forms have high modified Levenshtein distance values can be subjected to a predetermined threshold value. For example, the tokens whose alternate forms have modified Levenshtein distance more than 0.8 (a predetermined threshold value) will be identified by the candidate identification module 204.

The answer scorer 206 is configured to receive alternate forms of tokens identified by the candidate identification module 204, and evaluate how well passages containing a candidate answer match a question. The answer scorer 206 can be an existing answer scorer provided by the QA system 100, for example a skip-n-gram scorer, a textual-alignment scorer, or a bag-of-words scorer, etc. One example of candidate answer scoring which may be used in conjunction with the principles described herein is described in U.S. Patent Application Publication No. US20110125734A1, which is herein incorporated by reference in its entirety. In an embodiment, the answer scorer 206 accepts alternate forms (e.g., synonyms, or corrected spellings for misspellings) of the identified question tokens and passage tokens, along with a modified Levenshtein distance value provided by the match measurement module 202 for each alternate form. The modified Levenshtein distance value of each alternate form reflects how well the alternate form matches its original token. If the modified Levenshtein distance is close to 0, it indicates that the alternate form matches its original token well; while if the modified Levenshtein distance is close to 1, it indicates that the alternate form fails to match its original token well. For example, an alternate form "canine" (e.g., a synonym "canine") might carry a modified Levenshtein distance of 0.9 if the original token is "dog." Since 0.9 is close to 1, the alternate form "canine" does not match the original token "dog" well. The answer scorer 206 scores all the alternate forms of the identified tokens, and the scores of the alternate forms can be used to calculate a final score of the candidate answer, so that a list of candidate answers and a list of supporting passages can be presented to the QA system user. During scoring, the answer scorer 206 considers the alternate forms as synonyms of the original tokens.

Figure 3:
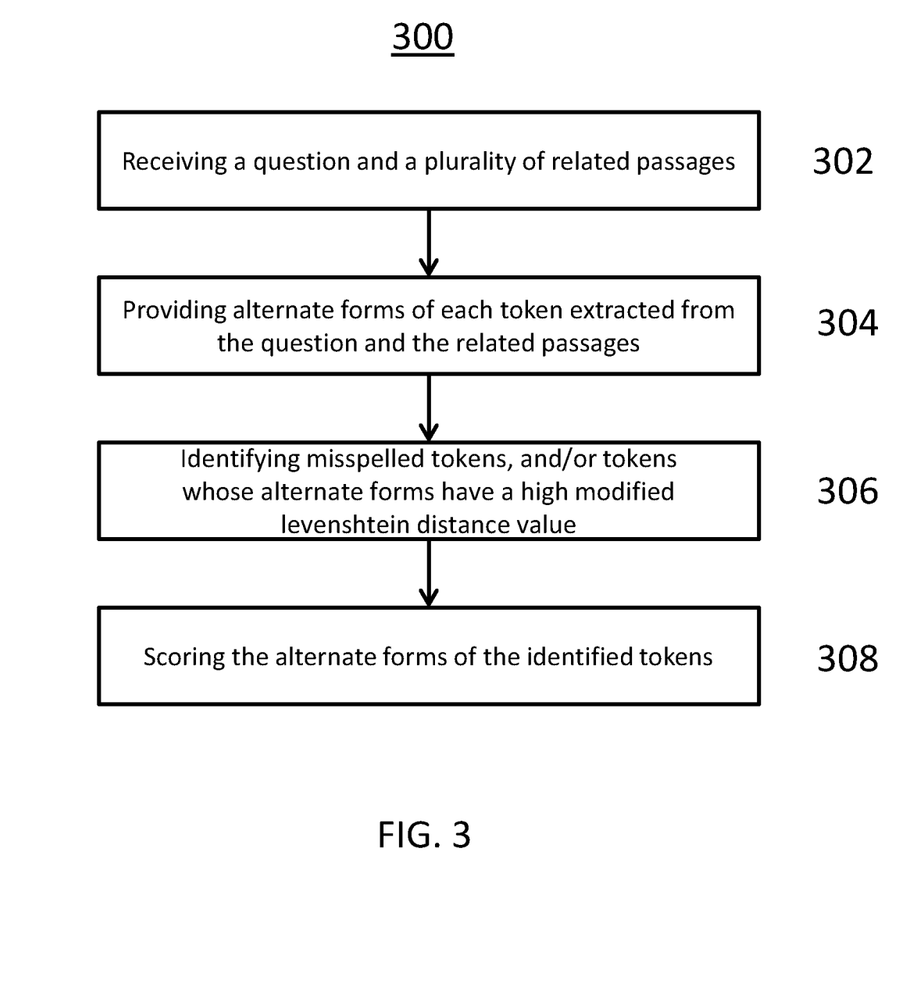
FIG. 3 depicts a flowchart illustrating a method for scoring candidate tokens with misspelling errors, according to some embodiments described herein.

FIG. 3 is a flowchart 300 illustrating a method for scoring candidate tokens with misspelling errors, according to embodiments herein. At step 302, the match measurement module 202 receives a question raised by a QA system user, and a plurality of passages related to the question. The plurality of passages related to the question are provided by the QA system 100. At step 304, the match measurement module 202 provides alternate forms of each token extracted from the question and the related passages. The alternate forms are obtained through a substitution confusion matrix, and a modified Levenshtein distance value is provided for each alternated form. Different substitution confusion matrices may be provided for OCR and STT, respectively. At step 306, among the tokens extracted from the question and the related passages, the candidate identification module 204 identifies misspelled tokens, and/or tokens whose alternate forms have a high modified Levenshtein distance values (i.e., 1 or close to 1). The tokens whose alternate forms have a high modified Levenshtein distance values may also include correctly spelled tokens. At step 308, the answer scorer 206 receives alternate forms of the tokens identified by the candidate identification module 204, and scores the alternate forms of the identified tokens. In an embodiment, each alternate form carries a modified Levenshtein distance value assigned by the match measurement module 202. The scores of the alternate forms are used to evaluate how well the alternate forms match any token in the question (if the original token of an alternate form is in the related passages) or passages (if the original token of an alternate form is in the question). The scores of the alternate forms can contribute to the final score for a ranked list of candidate answers and a ranked list of support passages.

In an embodiment, an exemplary method for scoring candidates with misspelling errors is provided. The match measurement module 202 receives a question "[w]hat kind of fighter did Luke Skywalker pilot," and a related passage "Luke Skywalker was the pitot of an X-Wing fighter in the Battle of Yavin." The passage "Luke Skywalker was the pitot of an X-Wing fighter in the Battle of Yavin" is obtained through OCR and has a misspelling "pitot". The match measurement module 202 provides alternate forms of each token extracted from the question and the related passage. For example, the word "pitot" of the related passage can have an alternate form "pilot." The alternate form "pilot" is obtained through a substitution confusion matrix, where t→1=0, and a modified Levenshtein distance value 0 is assigned for this alternated form. The candidate identification module 204 identifies the misspelled token "pitot." The answer scorer 206 receives the alternate form "pilot" of the token "pitot" identified by the candidate identification module 204, and scores the alternate form "pilot" of the identified token "pitot." The alternate form "pilot" of the identified token "pitot" matches the token "pilot" in the question, and thus the alternate form "pilot" of the identified token "pitot" is provided with a high score.

Figure 4:
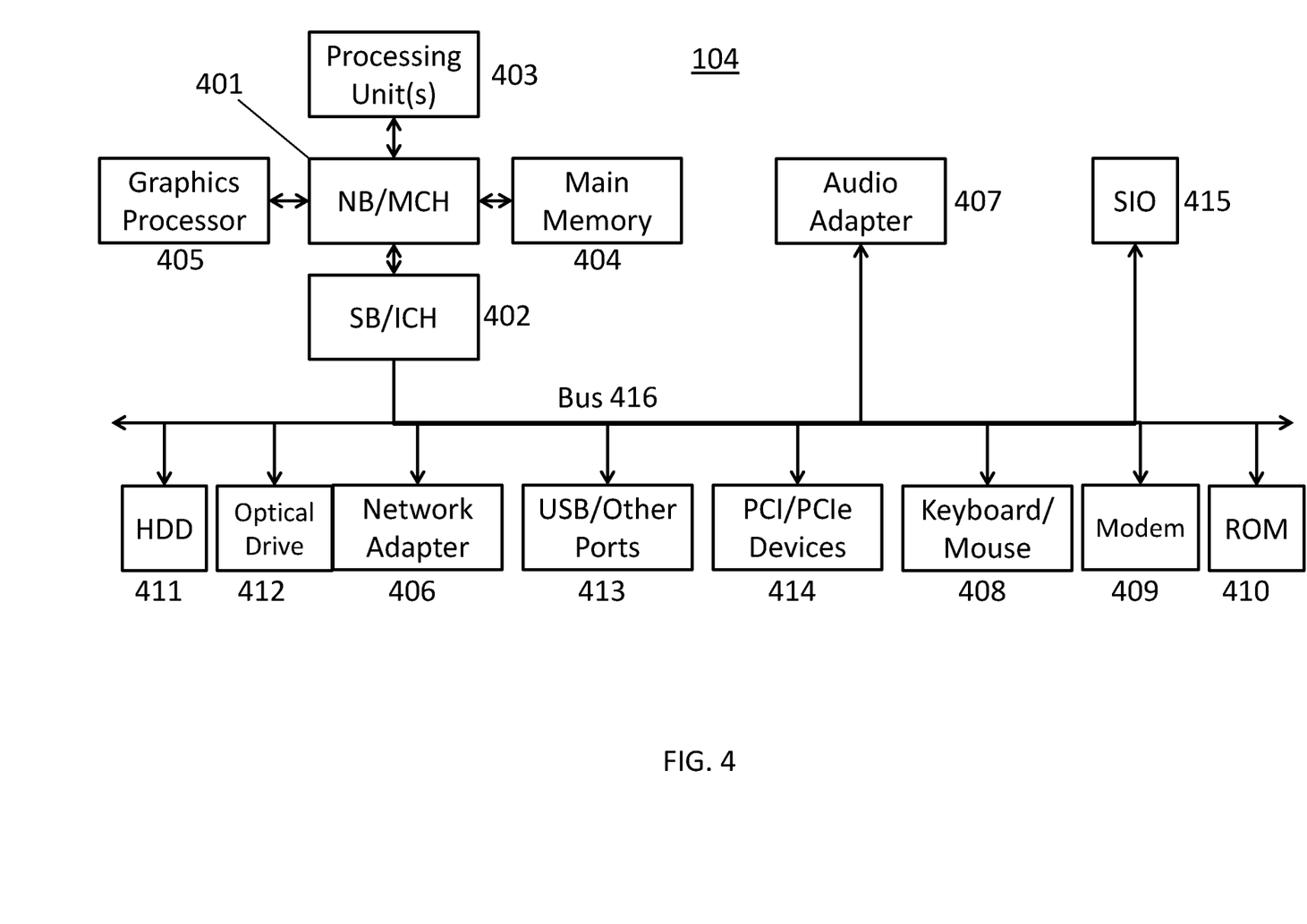
FIG. 4 is a block diagram of another example computer device in which aspects of the illustrative embodiments may be implemented.

FIG. 4 is a block diagram of an example computer device 104 in which aspects of the illustrative embodiments may be implemented. The computer device 104 is an example of a computer, such as a server or client, in which computer usable code or instructions implementing the process for illustrative embodiments of the present invention are located. In one embodiment, FIG. 4 represents a server computing device, such as a server, which implements QA system 100 and described herein.

In the depicted example, the computer device 104 may employ a hub architecture including a north bridge and memory controller hub (NB/MCH) 401 and south bridge and input/output (I/O) controller hub (SB/ICH) 402. Processing unit 403, main memory 404, and graphics processor 405 may be connected to the NB/MCH 401. Graphics processor 405 may be connected to the NB/MCH 401 through an accelerated graphics port (AGP).

In the depicted example, the network adapter 406 connects to the SB/ICH 402. The audio adapter 407, keyboard and mouse adapter 408, modem 409, read only memory (ROM) 410, hard disk drive (HDD) 411, optical drive (CD or DVD) 412, universal serial bus (USB) ports and other communication ports 413, and the PCI/PCIe devices 414 may connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 may use an integrated drive electronics (IDE) or serial advanced technology attachment (SATA) interface. The super I/O (SIO) device 415 may be connected to the SB/ICH 402.

An operating system may run on processing unit 403. The operating system could coordinate and provide control of various components within the computer device 104. As a client, the operating system may be a commercially available operating system. An object-oriented programming system, such as the Java™ programming system, may run in conjunction with the operating system and provide calls to the operating system from the object-oriented programs or applications executing on the computer device 104. As a server, the computer device 104 may be an IBM® eServer™ System p® running the Advanced Interactive Executive operating system or the Linux operating system. The computer device 104 may be a symmetric multiprocessor (SMP) system that may include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments of the generation system may be performed by the processing unit 403 using computer usable program code, which may be located in a memory such as, for example, main memory 404, ROM 410, or in one or more peripheral devices.

A bus system 416 may be comprised of one or more busses. The bus system 416 may be implemented using any type of communication fabric or architecture that may provide for a transfer of data between different components or devices attached to the fabric or architecture. A communication unit such as the modem 409 or network adapter 406 may include one or more devices that may be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the computer device 104 may take the form of a number of different data processing systems, including but not limited to, client computing devices, server computing devices, tablet computers, laptop computers, telephone or other communication devices, personal digital assistants, and the like. Essentially, computer device 104 may be any known or later developed data processing system without architectural limitation.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operation steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one may also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes may be implemented using hardware components, software components, and/or combinations thereof. No claim element herein is to be construed under the provisions of 35 U.S.C. 112 (f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method for identifying and correcting a misspelling in a question answering (QA) system, wherein the QA system is coupled to a document corpus, and the document corpus includes a plurality of documents related to a particular domain, the method comprising:

receiving, by a processor coupled to one or more user devices, an input question and a plurality of passages, wherein the plurality of passages are extracted from the document corpus by the QA system;

providing, by the processor, at least one alternate form for each token extracted from the input question and the plurality of passages; the step of providing at least one alternate form for each token further comprising:

providing, by the processor, a first substitution confusion matrix for the input question through a speech to text process, wherein a first group of characters are substituted with a first single character in the first substitution confusion matrix, wherein in the first substitution confusion matrix, a first modified Levenshtein distance value between the character "e"

and the character "o" is 0, a first modified Levenshtein distance value between the character "i" and the character "t" is 0, a first modified Levenshtein distance value between the character "a" and the character "o" is 0, and a first modified Levenshtein distance value between the character "rn" and the character "m" is 0;
providing, by the processor, the first modified Levenshtein distance value for each alternate form of each token extracted from the input question;
providing, by the processor, a second substitution confusion matrix for the plurality of passages through an optical character recognition process, wherein a second group of characters are substituted with a second single character in the second substitution confusion matrix, wherein in the second substitution confusion matrix, a second modified Levenshtein distance value between the character "sh" and the character "s" is 0, a second modified Levenshtein distance value between the character "ai" and the character "e" is 0, a second modified Levenshtein distance value between the character "ed" and the character "te" is 0, a second modified Levenshtein distance value between the character "s" and the character "th" is 0, and a second modified Levenshtein distance value between the character "t" and the character "k" is 0;
providing, by the processor, the second modified Levenshtein distance value for each alternate form of each token extracted from the plurality of passages;
identifying, by the processor, at least one misspelled token from the input question and the plurality of passages; and
scoring, by the processor, at least one alternate form of each identified misspelled token.

2. The method as recited in claim 1, wherein the at least one alternate form includes a synonym and a corrected spelling of the at least one misspelled token.

3. A computer program product for identifying and correcting a misspelling in a question answering (QA) system, the computer program product comprising a computer readable storage medium having program instructions embodied therewith, the program instructions executable by a processor to cause the processor to:
receive, by a processor coupled to one or more user devices, an input question and a plurality of passages, wherein the plurality of passages are extracted from the document corpus by the QA system;
provide, by the processor, at least one alternate form for each token extracted from the input question and the plurality of passages; the step of providing at least one alternate form for each token further causes the processor to:
provide, by the processor, a first substitution confusion matrix for the input question through a speech to text process, wherein a first group of characters are substituted with a first single character in the first substitution confusion matrix, wherein in the first substitution confusion matrix, a first modified Levenshtein distance value between the character "e" and the character "o" is 0, a first modified Levenshtein distance value between the character "i" and the character "t" is 0, a first modified Levenshtein distance value between the character "a" and the character "o" is 0, and a first modified Levenshtein distance value between the character "rn" and the character "m" is 0;
provide, by the processor, the first modified Levenshtein distance value for each alternate form of each token extracted from the input question;
provide, by the processor, a second substitution confusion matrix for the plurality of passages through an optical character recognition process, wherein a second group of characters are substituted with a second single character in the second substitution confusion matrix, wherein in the second substitution confusion matrix, a second modified Levenshtein distance value between the character "sh" and the character "s" is 0, a second modified Levenshtein distance value between the character "ai" and the character "e" is 0, a second modified Levenshtein distance value between the character "ed" and the character "te" is 0, a second modified Levenshtein distance value between the character "s" and the character "th" is 0, and a second modified Levenshtein distance value between the character "t" and the character "k" is 0;
provide, by the processor, the second modified Levenshtein distance value for each alternate form of each token extracted from the plurality of passages;
identify, by the processor, at least one misspelled token and the plurality of passages; and
score, by the processor, at least one alternate form of each identified misspelled token.

4. The computer program product as recited in claim 3, wherein the at least one alternate form includes a synonym and a corrected spelling of the at least one misspelled token.

5. A system for identifying and correcting a misspelling in a question answering (QA) system, comprising:
a processor configured to:
receive, by a processor coupled to one or more user devices, an input question and a plurality of passages, wherein the plurality of passages are extracted from the document corpus by the QA system;
provide, by the processor, at least one alternate form for each token extracted from the input question and the plurality of passages; the step of providing at least one alternate form for each token further configures the processor to:
provide, by the processor, a first substitution confusion matrix for the input question through a speech to text process, wherein a first group of characters are substituted with a first single character in the first substitution confusion matrix, wherein in the first substitution confusion matrix, a first modified Levenshtein distance value between the character "e" and the character "o" is 0, a first modified Levenshtein distance value between the character "i" and the character "t" is 0, a first modified Levenshtein distance value between the character "a" and the character "o" is 0, and a first modified Levenshtein distance value between the character "rn" and the character "m" is 0;
provide, by the processor, the first modified Levenshtein distance value for each alternate form of each token extracted from the input question;
provide, by the processor, a second substitution confusion matrix for the plurality of passages through an optical character recognition process, wherein a second group of characters are substituted with a second single character in the second substitution confusion matrix, wherein in the second substitution confusion matrix, a second modified Levenshtein distance value between the character "sh" and the character "s" is 0, a second modified Levenshtein distance value between the character "ai" and the character "e" is 0, a second modified Levenshtein distance value between the character "ed" and the character "te" is 0, a second modified Levenshtein distance value between the character "s" and the character "th" is 0, and a second modified Levenshtein distance value between the character "t" and the character "k" is 0;

provide, by the processor, the second modified Levenshtein distance value for each alternate form of each token extracted from the plurality of passages;

identify, by the processor, at least one misspelled token; and score, by the processor, at least one alternate form of each identified misspelled token.

6. The system as recited in claim 5, wherein the at least one alternate form includes a synonym and a corrected spelling of the at least one misspelled token.

\* \* \* \* \*